United States Patent
Carlson et al.

(10) Patent No.: US 6,520,047 B2
(45) Date of Patent: Feb. 18, 2003

(54) VIBRATION DAMPING DEVICE

(75) Inventors: Cora Carlson, Dittelbrunn (DE); Bernd Peinemann, Niederwerrn (DE); Jürgen Weth, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/999,318

(22) Filed: Oct. 31, 2001

(65) Prior Publication Data

US 2002/0046623 A1 Apr. 25, 2002

Related U.S. Application Data

(62) Division of application No. 09/526,186, filed on Mar. 15, 2000.

(30) Foreign Application Priority Data

Mar. 16, 1999 (DE) .......................................... 199 11 562

(51) Int. Cl.$^7$ ............................................. F16F 15/121
(52) U.S. Cl. ........................... 74/574; 192/207; 464/81; 464/84
(58) Field of Search ........................... 74/574; 192/55.6, 192/207; 464/24, 68, 81, 84, 100, 101

(56) References Cited

U.S. PATENT DOCUMENTS

| | | | |
|---|---|---|---|
| 2,317,983 A | | 5/1943 | Fisher .......................... 74/604 |
| 4,800,996 A | * | 1/1989 | Loizeau ....................... 192/207 |
| 5,295,411 A | | 3/1994 | Speckhart ..................... 75/574 |
| 5,533,422 A | | 7/1996 | Speckhart ..................... 74/573 |
| 5,751,202 A | | 5/1998 | Seino .......................... 335/296 |
| 5,976,020 A | * | 11/1999 | Lohaus et al. ................. 74/574 |
| 6,067,876 A | * | 5/2000 | Lohaus ......................... 74/574 |
| 6,109,134 A | * | 8/2000 | Sudau .......................... 192/207 |
| 6,238,293 B1 | * | 5/2001 | Peinemann ..................... 464/81 |
| 6,244,134 B1 | * | 6/2001 | Sudau .......................... 464/68 |

FOREIGN PATENT DOCUMENTS

| | | | |
|---|---|---|---|
| DE | 767 802 | 8/1953 | |
| DE | 32 28 738 | 4/1983 | ............. F16D/3/80 |
| DE | 33 09 928 | 9/1984 | ............. F16D/3/80 |
| DE | 33 22 368 | 1/1985 | ............. F16D/3/14 |
| DE | 36 10 127 | 12/1986 | ........... F16D/13/60 |
| DE | 38 39 436 | 5/1990 | ............. F16F/15/12 |
| DE | 94 14 314 | 1/1995 | ........... F16D/13/60 |
| DE | 44 26 317 | 2/1995 | ............. F16F/15/30 |
| DE | 195 44 832 | 6/1997 | ............. F16D/3/68 |
| DE | 196 27 764 | 1/1998 | .......... F16F/15/131 |
| DE | 198 30 827 | 2/1999 | ........... F16D/13/60 |

* cited by examiner

Primary Examiner—Chong H. Kim
(74) Attorney, Agent, or Firm—Cohen, Pontani, Lieberman & Pavane

(57) ABSTRACT

A vibration damping device for a motor vehicle drive system includes a base body rotatable about an axis of rotation and a deflection mass arrangement having at least one deflection mass and a deflection path associated with the at least one deflection mass. The at least one deflection mass is movable along the deflection path when the base body rotates about the axis of rotation. The deflection path defines a radial outer area of a movement space in the base body in which the at least one deflection mass is movable. The base body includes a carrier element in which the movement space is arranged and a first closure element connected with and constructed separately from the carrier element and arranged at a first axial side of the carrier element for closing the movement space in a first axial direction. The base body also has a second closure element connected with and constructed separately from the carrier element arranged at a second axial side of the carrier element for closing the movement space for the at least one deflection mass in the second axial direction.

8 Claims, 9 Drawing Sheets

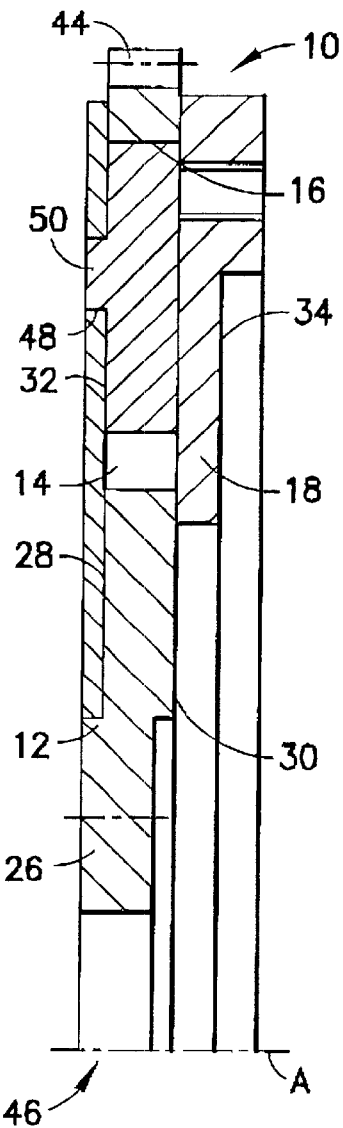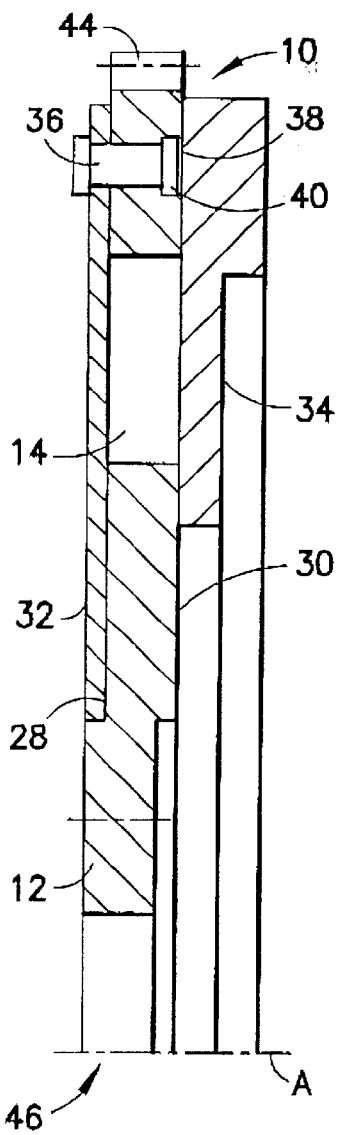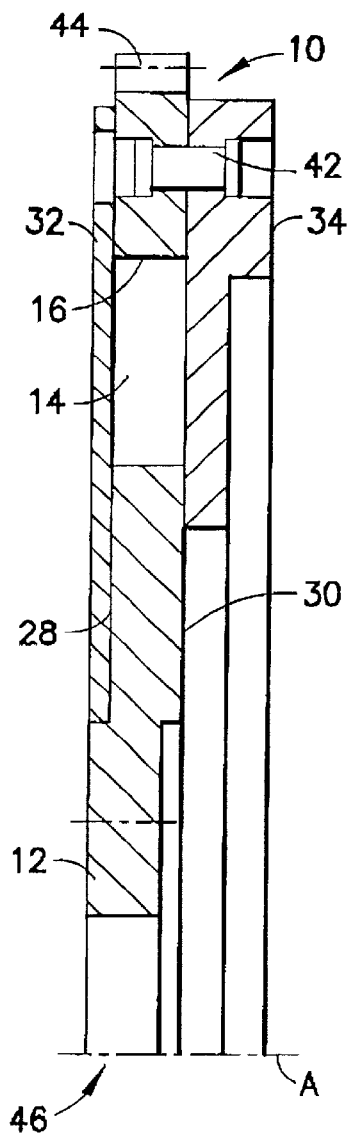
FIG.2   FIG.3   FIG.4
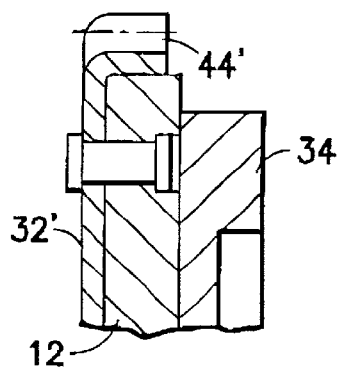
FIG.5

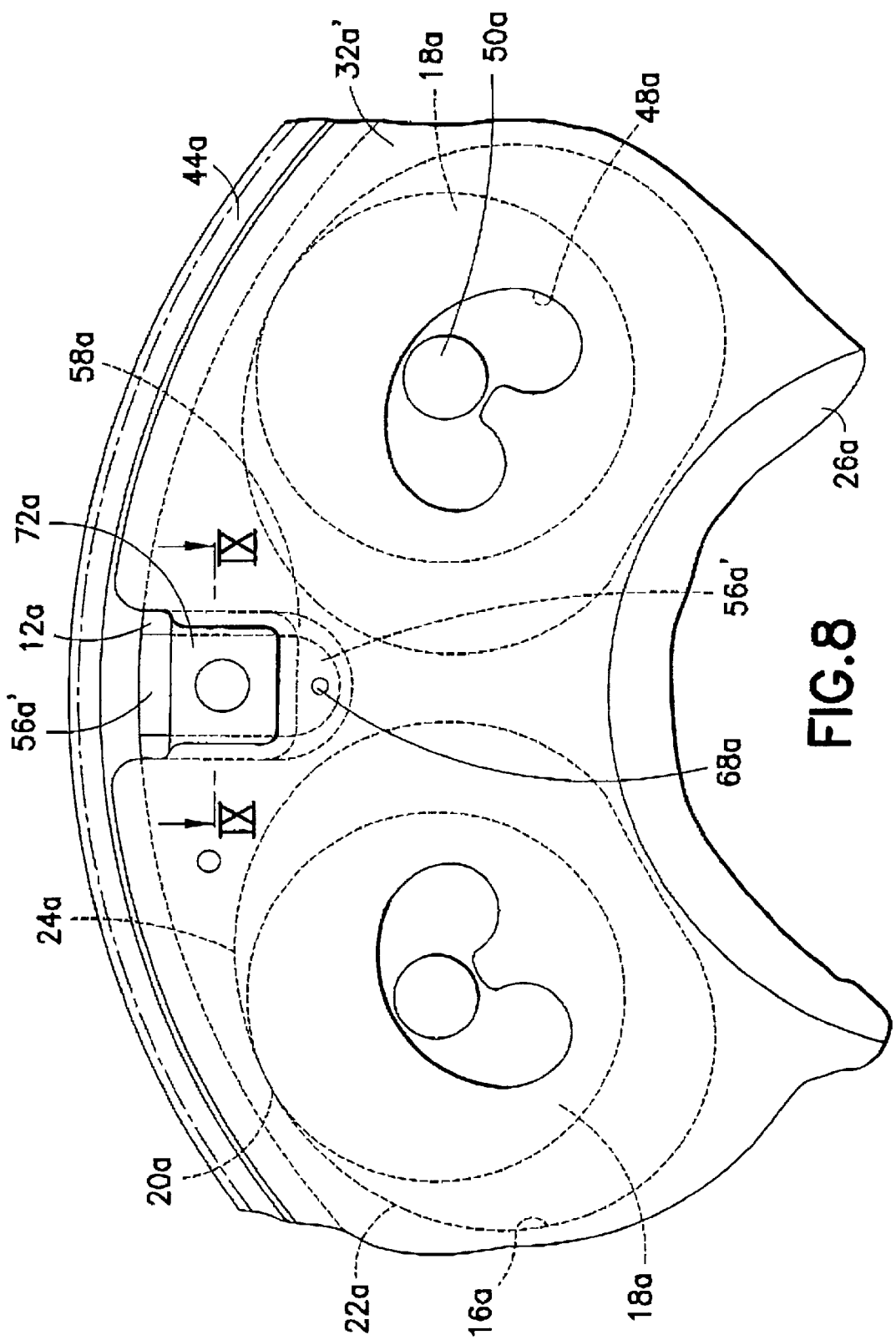

VIBRATION DAMPING DEVICE

CROSS-REFERENCE TO RELATED APPLICATION

This application is a Divisional of U.S. patent application Ser. No. 09/526,186, filed Mar. 15, 2000.

BACKGROUND OF THE INVENTION

1. Field of the Invention

The present invention is directed to a vibration damping device for a motor vehicle drive system having a base body rotatable about an axis of rotation and a deflection mass arrangement with at least one deflection mass and a deflection path which is associated with the at least one deflection mass and along which the at least one deflection mass is movable when the base body rotates about the axis of rotation, wherein a movement space in which the at least one deflection mass can move and which is defined by the deflection path associated with the at least one deflection mass is arranged in the base body for the at least one deflection mass.

2. Description of the Related Art

A damping device is disclosed, for example, in German reference DE 44 26 317 A1 having a movement space formed at a carrier part for each deflection mass. The carrier part is connectable with a rotating axle or pin for rotating about an axis of rotation. The movement space is formed by welding a cup-shaped part made of sheet metal to the carrier part after the associated deflection mass has been positioned inside of it. Accordingly, a cup-shaped part of this type must be welded onto the base part separately for every deflection mass, which results in a costly manufacturing process.

SUMMARY OF THE INVENTION

It is an object of the present invention to provide a vibration damping device of the type mentioned above which can be constructed in a simple manner.

According to the invention, this object is met by a vibration damping device, in particular for a drive system of a motor vehicle, comprising a base body which is rotatable about an axis of rotation and a deflection mass arrangement with at least one deflection mass and a deflection path which is associated with the at least one deflection mass and along which the at least one deflection mass can move when the base body rotates about the axis of rotation, wherein a movement space in which the at least one deflection mass can move and which is defined by the deflection path associated with the at least one deflection mass is arranged in the base body for the at least one deflection mass.

According to a first embodiment of the present invention, the base body comprises a carrier element, a first closure element arranged on a first axial side of the carrier element, and a second closure element arranged on a second axial side of the carrier element. The carrier element has a movement space for the at least one deflection mass. The first closure element is constructed separately from the carrier element and is connected to the carrier element at the first axial side for closing the movement space for the at least one deflection mass in a first axial direction. The second closure element is also constructed separately from the carrier element and is connected to the carrier element for closing the movement space for the at least one deflection mass in a second axial direction.

In this embodiment, the assembly process of the vibration damping device is simplified and the configuration of the vibration damping device made this way is stable because the quantity of structural component parts is appreciably reduced relative to the prior art.

For example, the carrier element with the movement space formed therein for the at least one deflection mass may be formed by a stamping process, preferably from sheet metal.

In this embodiment, either the carrier element or one of the first and second closure element may be constructed for connection at the rotating shaft.

According to a second embodiment of the present invention, the base body comprises a carrier element and a receiving element which is formed separately from the carrier element and which is arranged at the carrier element. The movement space for the at least one deflection mass is provided in the receiving element. The base body also comprises a first closure element covering at least at a first axial side of the movement space. The first closure element is constructed separately from the receiving element and closes the movement space for the at least one deflection mass at the first axial side. The embodiment also has a very simple construction because it also has a reduced number of parts compared with the prior art.

The receiving element may be formed from plastic such, for example, as fiber-reinforced plastic. To increase the durability of the receiving element when the receiving element is made of plastic, a path element made of a hard material such as sheet steel may be arranged in the movement space for the at least one deflection mass so that the at least one deflection mass is movable along this path element.

Furthermore, a positioning arrangement may be arranged in the base body for providing a predetermined relative positioning of the receiving element and/or of the closure element relative to the carrier element to facilitate assembly. This configuration predetermines the position in which the different parts are joined together and eliminates the requirement for other external positioning presets.

The positioning arrangement may, for example, have at least one positioning projection at the carrier element and/or closure element which engages a positioning recess of the receiving element.

In the second embodiment, the manufacturing process may be further simplified when the receiving element itself forms a second closure element which closes the movement space for the at least one deflection mass at a second axial side and which has, in its radial outer area, the deflection path for the at least one deflection mass.

In particular, the first and/or second closure elements may comprise a sheet metal element formed by shaping.

To increase stability in this case while achieving a simple construction, the second closure element may be supported at the first closure element, at least by portions, via the deflection path which is connected to the second closure element.

Instead of using the receiving element to close the second axial side of the movement space, a very simple construction of the present invention may be achieved in that the carrier element closes the movement space for the at least one deflection mass at the second axial side.

According to a third embodiment of the present invention, a very simply built vibration damper is achieved when the base body has the following component groups: a carrier element, a path arrangement which forms the deflection path for the at least one deflection mass, and a closure element which is formed separately from the carrier element and which closes the movement space for the at least one deflection mass in a first axial direction at least at a first axial side of the path arrangement.

A minimum quantity of parts are used when the carrier element and the path arrangement are constructed as one part together. This may be achieved when the carrier element and path arrangement comprise a cast metal part.

Alternatively, the path arrangement for every deflection mass may comprise a path element, preferably made of sheet steel, which is held between the carrier element and the first closure element. In this way, a material especially suited to the individual path elements may be used and the individual path elements may be subjected to additional treatment steps in a very simple manner. For example, the path elements may be provided with a toothing configuration.

Further, a second closure element may be arranged at least at a second axial side of the path arrangement in the carrier element which closes the movement space for the at least one deflection mass toward the second axial side. Every path element is held between the first and second closure elements. To achieve a stable configuration each path element may comprise an engagement formation by which it is engageable, with the first closure element on the one hand and with the carrier element or the second closure element on the other hand.

For example, the engagement formation can have a plurality of axially extending projections which engage in recesses of different components.

A positioning arrangement may be provided in any of the above embodiments for positioning the first closure element and/or the second closure element at a predetermined location relative to the carrier element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 2 is a longitudinal sectional view of the vibration damping device in FIG. 1 along a line II—II;

FIG. 3 is a longitudinal sectional view of the vibration damping device of FIG. 1 along a line III—III;

FIG. 4 is a longitudinal sectional view of the vibration damping device in FIG. 1 along line IV—IV;

FIG. 5 is a longitudinal sectional view of a vibration damping device similar to FIG. 3 having an alternative construction in the region of a starter ring gear;

FIG. 8 is a partial axial view of a further embodiment of the vibration damping device according to the present invention;

DETAILED DESCRIPTION OF THE PRESENTLY PREFERRED EMBODIMENTS

FIGS. 1 to 5 show a first embodiment of a vibration damping device 10 according to the present invention. This vibration damping device 10 may, for example, be formed in a flywheel of a motor vehicle friction clutch or may be integrated in some other location in a rotating system as a separate damping device.

Figure 1:
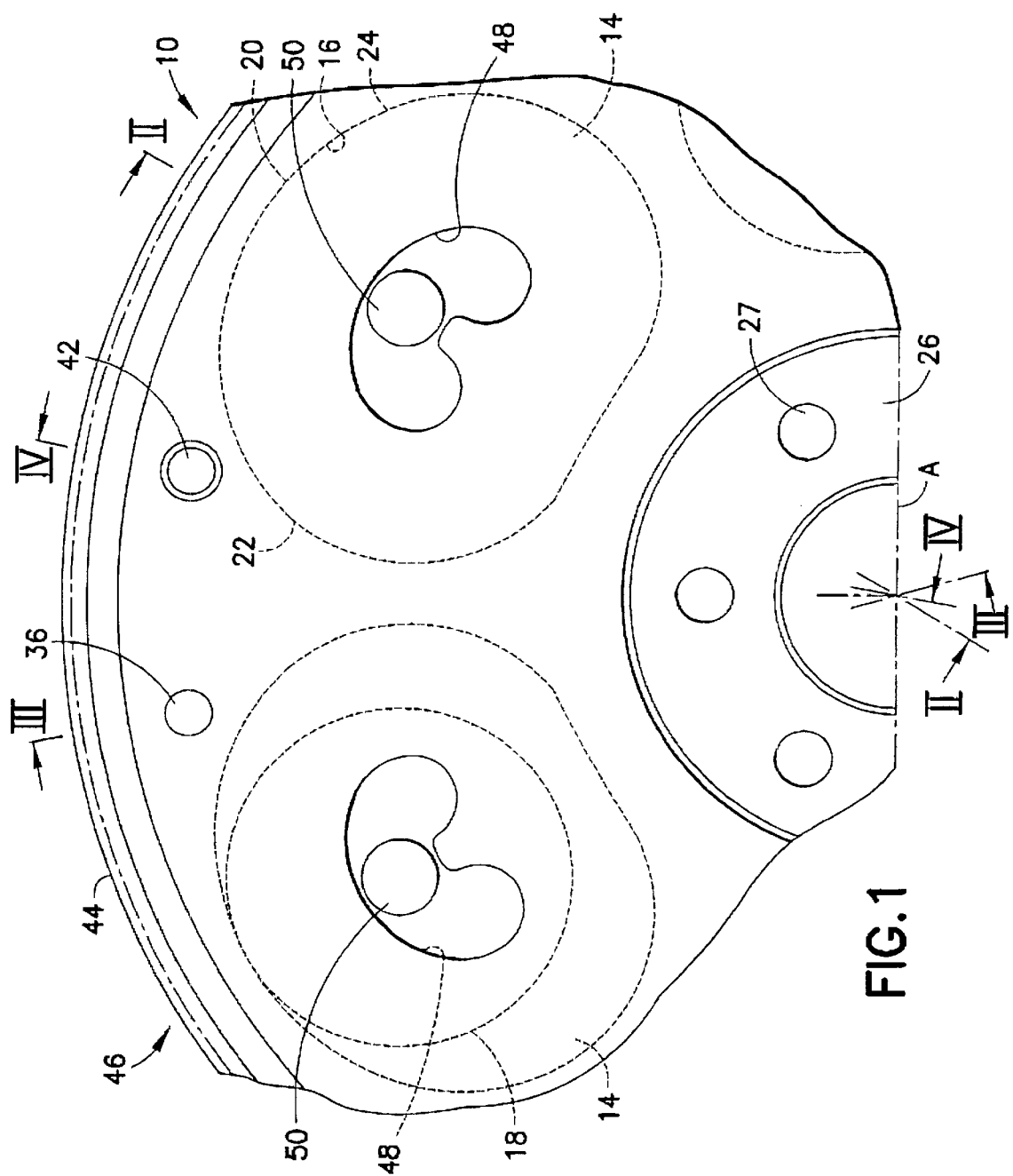
FIG. 1 is a partial axial view of a vibration damping device according to a first embodiment of the present invention.

The vibration damping device 10 comprises a carrier part 12 which is constructed in the shape of a ring disk. The carrier part 12 may be produced, for example, by stamping out of a sheet metal element. A plurality of self-contained movement spaces 14 (shown in dashed lines in FIG. 1) are formed in the carrier part 12 successively in the circumferential direction and may be produced during the stamping process. A radial outer region of each of the movement spaces 14 forms a deflection path 16 for a deflection mass 18 that is arranged in this movement space 14. The FIGS. 1–5 show that the deflection masses 18, one of which is shown in dashed lines in FIG. 1, are constructed in an approximately circular-cylindrical manner. The deflection paths 16 associated with the respective deflection masses 18 have a curved shape with reference to an axis of rotation A of the damping device 10. The curves of deflection paths 16 are flattest, i.e., have the largest radius of curvature, in their vertex area 20 that is located at a radial farthest location from the axis of rotation A and are curved toward the axis of rotation A at both sides of this vertex area 20 in respective curvature areas or deflection paths 22, 24. The curvature shape of the deflection paths 16 is preferably epicycloidal. When the entire vibration damping device 10 rotates about the axis of rotation A, the deflection masses 18, due to centrifugal forces, arrange themselves in the vertex areas 20 of the associated deflection paths 16. When irregularities occur in rotation which may, for example, be generated by the explosions occurring periodically in an internal combustion engine the deflection masses 18 are deflected from their vertex areas 20 into deflection areas 22 and 24, respectively by these irregularities in rotation and oscillate in the centrifugal potential. The epicycloidal shape of the deflection paths 16 ensures that the natural frequency of these individual oscillators is substantially unimpaired by the deflection amplitude. The oscillator may be adapted to a predetermined frequency by designing a predetermined path curvature of the deflection path 16 and a predetermined mass and mass moment of inertia of the deflection mass 18 for damping oscillations at the predetermined frequency. Damping devices of the type mentioned above are preferably used for damping or eliminating higher harmonic orders of the excitation frequencies generated by explosion or combustion strokes of an internal combustion engine. It is noted that a plurality of oscillators with different natural frequencies may be provided simultaneously by providing different curved paths or different weight deflection masses in a damping device to damp different excitation frequencies.

A hub portion 26 is arranged in a radial inner area of the carrier part 12. A plurality of fastening openings 27 are provided in this hub portion 26 for arranging the latter at, for example, a crankshaft of an internal combustion engine. Cover plates 32, 34 are arranged at both axial sides 28, 30 of the carrier part 12 and close both axial sides of the respective movement spaces 14. The cover plate 32 is preferably an annular sheet metal part which is produced by stamping and the cover plate 34 is preferably a cast part to which a thrust plate assembly or a housing of a motor vehicle friction clutch may be fastened using a known method. The cover plate 34 may also by an integral part the thrust plate assembly or housing of a motor vehicle friction clutch.

When assembling a vibration damper 10 as shown in FIGS. 1–5, the cover plate 32 may first be fixedly connected with the carrier element 12 at a radial outer area by a plurality of connection bolts or connection rivets 36 which are arranged in a circumferential direction and which are guided through corresponding openings in the cover plate 32 and carrier element 12. The carrier part 12 includes countersink recesses 38 at the ends of the openings in which rivet heads or bolt heads 40 of the connection rivets are completely countersunk. After the cover plate 32 has been connected with the carrier part 12 and the cover plate 32 has been centered on the carrier part by the hub portion 26, the individual deflection masses 18 are inserted into the respective movement spaces 14 and the cover plate 34 is subsequently applied to the axial side 30 of the carrier part 12.

FIG. 4 shows that through-openings associated with one another are formed in the cover plate 32, the carrier part 12 and in cover plate 34. Accordingly, connection bolts or connection rivets 42 may be inserted through these through-openings for fixedly connecting the carrier part 12 with the cover plate 34. In this way, a complete closure of the movement spaces 14 for the respective deflection masses 18 is provided. Accordingly, the deflection paths 16 close the radial outer sides of each movement space 14 the cover plates 32, 34 close the two axial sides 28, 30 of each movement space 14.

FIGS. 2 to 4 further show that a starter ring gear 44 is already formed integral with a radial outer side of the carrier part 12. A crankshaft of an internal combustion engine may be coupled with the carrier part 12 so as to be fixed with respect to rotation relative to it so that the internal combustion engine may be started via this starter ring gear 44. Alternatively, as is shown in FIG. 5, the cover plate 32' may be lengthened radially outward and bent axially, so that it has a cup-shaped configuration. In this axially bent region, a toothing may be formed integral with the cover plate 32' by shaping (e.g., deep drawing) to form the starter ring gear 44'.

In the embodiments of the vibration damping device 10 shown in FIGS. 1 to 5, the entire base body 46 of the vibration damping device 10 is essentially formed of the carrier element 12 and the two cover plates 32, 34, i.e., three main components. The assembly process for the vibration assembly device may be arranged in a very simple process. Since all of the movement spaces 14 and the associated deflection paths 16 are provided in the carrier part 12, no elaborate steps are required for positioning the carrier part 12 and the cover plates 32, 34 in a predetermined rotational position with respect to one another. Nevertheless, a relative positioning of this kind is already be predetermined by the preset of the through-openings for the connection bolts or connection rivets 36, 42.

To provide improved guidance for the individual deflection masses 18 along the deflection path 16, a guide path 48 in the form of a kidney-shaped or peanut-shaped opening or recess is formed in the cover plate 32 so as to be associated with every deflection mass 18. A guide pin 50 projecting from an axial side of the deflection mass 18 facing the cover plate 32 is guided in the guide path 48. The guide path 48 exactly follows the respective deflection path 16 so that the guide pins 50 move along the associated guide paths 48 without jamming during the movement of the deflection masses 18 along these deflection paths 16. It is noted that guide paths of this kind may, of course, be provided in the cover plate 34 instead of or in addition to guide paths 48 for receiving guide pins projecting from the other axial side of the deflection masses 18.

Further, a toothing configuration may optionally be provided, for example, at every deflection path 16 so that a corresponding toothing configuration at the outer circumference of the respective deflection masses 18 may be received in a meshed engagement at the deflection path 16. The meshed engagement ensures that a compulsory or positive rolling movement is generated during the movement of the deflection masses 18 along the associated deflection paths 16 and a transition to an undefined sliding state of the deflection masses is prevented to avoid a detuning of the oscillators. Since the carrier part 12 is formed as a separated stamped part with the movement spaces 14 and deflection paths 16 provided therein, the toothing configuration may be formed in a simple manner during the stamping process. Further, the carrier part 12 may be hardened as a separate structural component part in a simple manner or may be pretreated in some other manner for operation.

It is noted that in the embodiment according to FIGS. 1 to 5, alternatively or in addition to the coupling via the hub area 26, the vibration damping device 10 may also be coupled to the rotating shaft by a portion of the cover plate 34 constructed as a cast part, this portion being lengthened radially inward.

Figure 6:
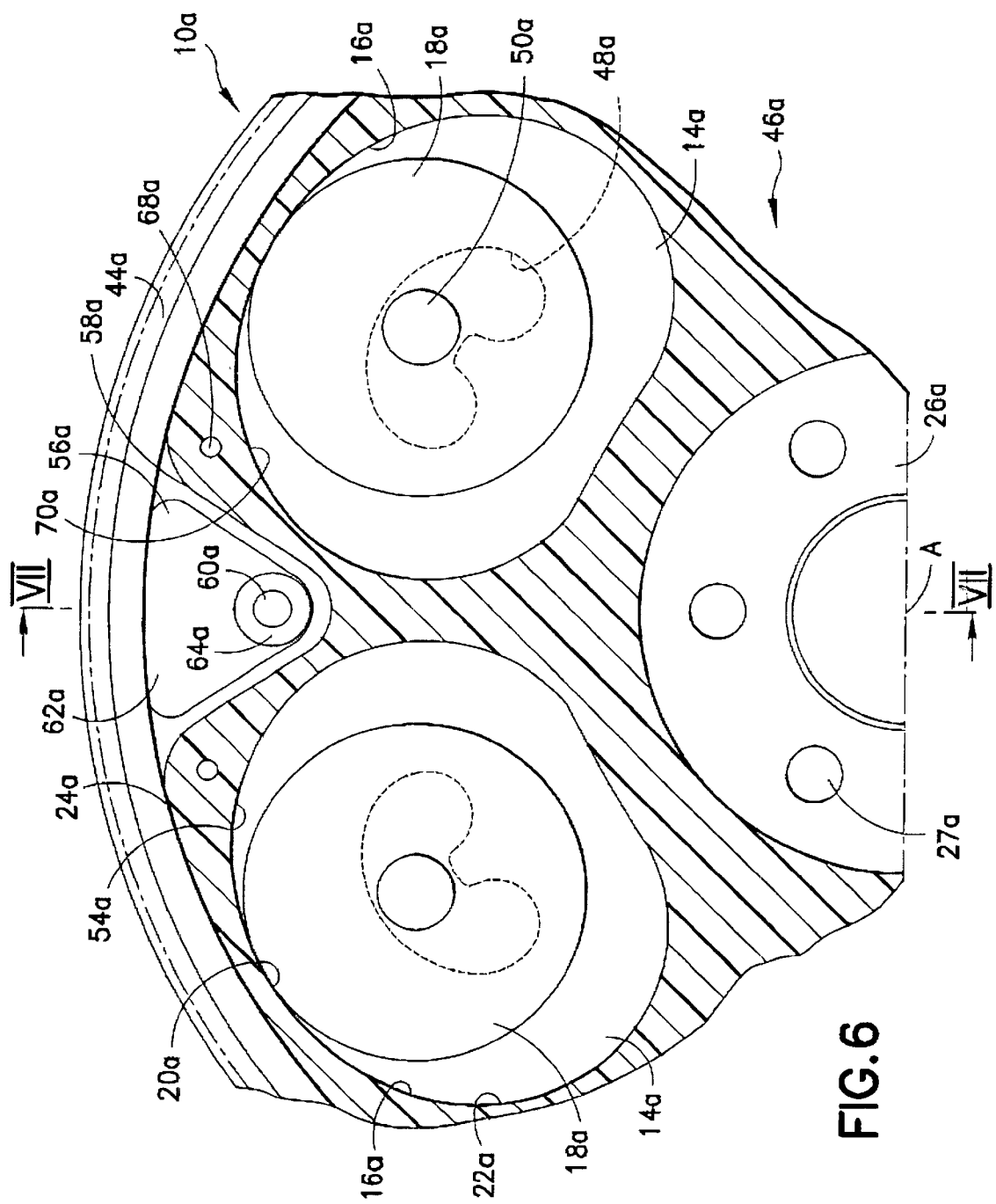
FIG. 6 is a partial axial view of a second embodiment of the vibration damping device according to the present invention in section along line VI—VI in FIG. 7.
Figure 7:
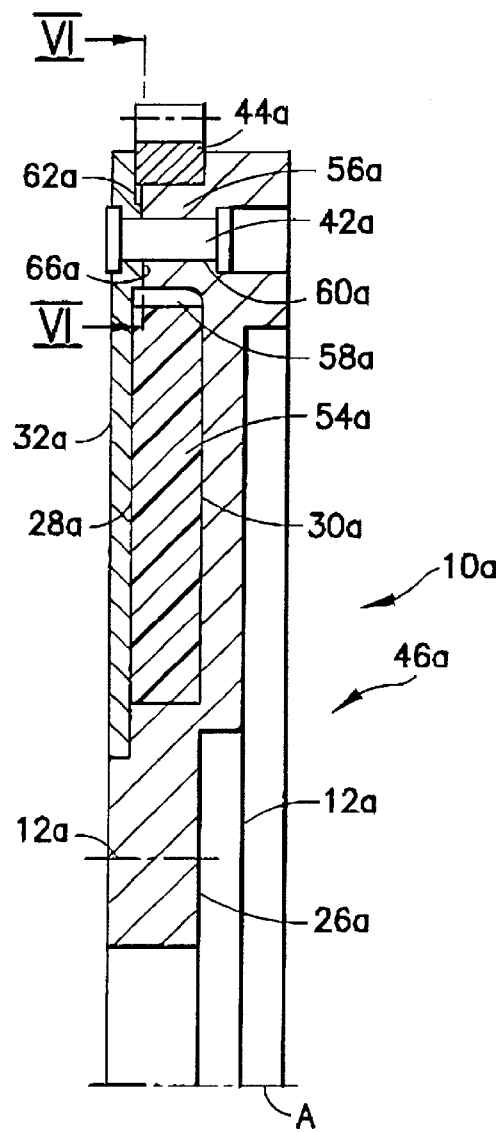
FIG. 7 is a longitudinal sectional view of the vibration damping device along line VII—VII in FIG. 6.

An alternative embodiment form of a vibration damper according to the invention is shown in FIGS. 6 and 7. Components which correspond with respect to construction or function to components described above are designated by the same reference numbers with a suffix "a" appended thereto.

In the embodiment form according to FIGS. 6 and 7, a receiving element 54a enclosing the hub area 26a is provided at the carrier part 12a. The receiving element 54a is approximately circular and defines the movement spaces 14a for the deflection masses 18a. The movement spaces 14a are arranged successively in the circumferential direction about the axis of rotation A. A deflection path 16a is arranged at a radial outer side of each of these movement spaces 14a.

A radial outer area of the carrier part 12a has a plurality of axially extending positioning projections 56a distributed along the circumference. Positioning recesses 58a are arranged on the receiving element 54a which correspond to the positioning projections 56a. When the receiving element 54a is pushed onto the hub portion 26a of the carrier part 12a, the positioning projections 56a and the positioning recesses 58a require the carrier part 12a and receiving element 54a to be positioned at a predetermined relative rotational positioning.

Furthermore, each positioning projection 56a is penetrated by a rivet opening 60a through which a fastening rivet 42a may be guided to fix the cover plate 32a to the carrier part 12a. The positioning projection 56a has a contact surface 62a facing the cover plate 32a. A positioning recess 64a is constructed on the contact surface of each positioning projection 56a so as to surround every through-opening 60a. A positioning portion 66a project from at the cover plate 32a may be formed by pressing out or embossing and engages in the positioning recess 64a so that the cover plate 32a is held in a defined position with respect to the carrier part 12a. Further, positioning cams (not shown in the drawings) may be arranged at the cover plate 32a to engage in corresponding cam receptacles 68a of the receiving element 54a, so that the receiving element 54a is fixed and positioned relative to the cover plate 32a with respect to relative rotation. Accordingly, due to the positioning projections 56a on the one hand and the cooperating positioning cams and cam receptacles 68a on the other hand, a predetermined positioning of the receiving element 54a is provided with respect to its position relative to the carrier part 12a and to the cover plate 32a. The radial outside of the positioning projections 56a are surrounded by a starter ring gear 44a constructed as a separate structural component part and centered by the positioning projections 56a with respect to the axis of rotation A. The ring gear 44a is clamped axially between the carrier part 12a and the cover plate 32a and may be secured against rotation at the base body 46a by shrinking or pressing on the positioning projections 56a which follow one another in the circumferential direction.

In the embodiment form shown in FIGS. 6 and 7, the receiving element 54a may, for example, comprise a plastic disk which is simple and inexpensive to produce. The plastic disk may optionally be stabilized by providing a fiber reinforcement, for example, glass fiber reinforcement or carbon fiber reinforcement, and may be produced in virtually any shape. To ensure high durability when this receiving element 54a is produced from plastic, a path element 70a may be introduced in every movement space 14a as shown on the right side of FIG. 6. The path element 70a extends in the radial outer area along a wall defining the movement space 14a and forms the deflection path 16a. These path elements 70a may be produced from strip steel, for example, and may be hardened before being introduced into the movement spaces 14a. Further, the toothing configuration mentioned above may be incorporated in the path element 70a when the path element 70a comprises a steel strip of the type mentioned above to provide a compulsory rolling of the individual deflection masses 18a. The path element 70a may be introduced and incorporated into the receiving element 54a, for example, during the production process of the receiving element 54a. Further, this path element 70a may be hardened or subjected to additional treatment before being incorporated in the receiving element 54a. A centering of the respective deflection masses 18a may also be provided, if necessary, by a corresponding path profile.

Accordingly, in the embodiment of the vibration damping device in FIGS. 6 and 7, the carrier part 12a itself forms an axial closure of the movement spaces 14a, namely, at the second axial side 30a of the receiving element 54a. FIG. 6 shows that the above-mentioned guide paths 48a may be provided at the carrier part 12a and/or at the cover plate 32a and guide pins or guide projections 50a of the deflection masses 18a may be guided in these guide paths 48a.

Figure 9:
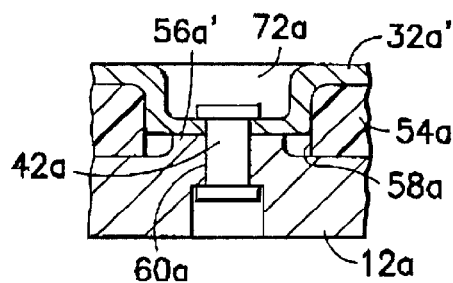
FIG. 9 is a partial sectional view of the vibration damping device along a line IX—IX in FIG. 8.

FIGS. 8 and 9 show an embodiment of a vibration damping device that is a modification of the embodiment shown in FIGS. 6 and 7. In this embodiment, positioning projections 56a' at the carrier part 12a are constructed so as to be appreciably shorter in the axial direction and that a positioning shoulder 72a is associated with each positioning projection 56a' at the cover plate 32a'. This positioning shoulder 72a forms another positioning projection that engages the positioning recess 58a of the receiving element 54a. Accordingly, the positioning shoulder 72a positions the receiving element 54a so that the receiving element is fixed with respect to rotation relative to the cover plate 32a'. A connection via rivet bolts 42a again produces a fixed positioning of the cover plate 32a' relative to the carrier part 12a. A cam receptacle 68a associated with a positioning cam at the cover plate 32a' may optionally be provided, if required, at the carrier part 12a in the area of a respective positioning projection 56a' as is indicated in FIG. 8 to achieve an additionally defined rotational positioning between the cover plate 32a' and the carrier part 12a before the rivet bolts 42a are introduced. The cams and cam receptacles may be required especially when the guide paths 48a shown are provided in the cover plate 32a' as well as in the carrier part 12a, since an exact overlapping of these two guide path areas associated with an individual deflection mass 18a is required for the deflection masses 18a to proceed in their movement without jamming. The receiving element 54a shown in FIGS. 8 and 9 may be constructed in the manner described above with respect to FIGS. 6 and 7.

Another alternative embodiment form of a vibration damping device 10b according to the present invention is shown in FIGS. 10 to 15. Components which correspond in construction and function to components described above are designated by the same reference number with a suffix "b".

In the embodiment form according to FIGS. 10 to 15, a plurality of positioning projections 56b are distributed in a circumferential direction in a radial outer area of the carrier part 12. Each of the positioning projections 56b has a through-opening 60b for receiving connection rivets 42b. These openings 60b are surrounded by a recess 64b at the contact surface 62b of the positioning projections 56b. Shoulders 66b are provided in the cover plate 32b to engage these recesses 66b and accordingly to provide a defined relative rotational position between the cover plate 32b and carrier part 12b.

An inner plate 80b is inserted in the carrier part 12b so that it surrounds the hub area 26b. The inner plate 80b has a positioning recess 58b associated with each of the positioning projections 56b for positioning the carrier part 12b and inner plate 80b relative to one another. In this way, the cover plate 32b and the inner plate 80b are also held with respect to one another in a given relative position.

Figure 13:
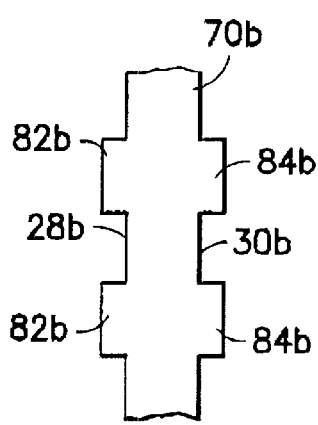
FIG. 13 is a view of a path element facing a contact surface of the path element.

The deflection paths 16b for the different deflection masses 18b are formed by separate path elements 70b. A plan view of the developed configuration of the path elements 70b before installation is shown in FIG. 13. Every path element 70b is elongated and comprises a strip having a plurality of engagement projections 82b and 84b projecting respectively from its two axial sides 28b, 30b. Before installation, the individual path elements 70b are curved and optionally hardened so that they ultimately assume the curved shape shown in FIG. 10 and accordingly define the redial outer side of the movement space 14b for each of the associated deflection masses 18b. The path elements 70b may also be provided with a toothing or a center guide for the respective deflection masses 18b.

During assembly of the vibration damping device, the inner plate 80b is first inserted in the carrier part 12b. The engagement projections 84b of the prepared path elements 70b are then inserted in corresponding recesses or openings 86b in the inner plate 80b. The deflection masses 18b are then positioned in the respective movement spaces 14b assigned to them and the cover plate 32b (shown only in the left portion of FIG. 10) is arranged so that the engagement projections 82b of the path elements 70b enter corresponding recesses or openings 88b in the cover plate 32b.

The movement spaces 14b are accordingly closed at one axial side by the cover plate 32b and at the other side by the inner plate 80b and are defined on the radial outer side by the path elements 70b. In contrast to the embodiments of FIGS. 1–9, not every movement space 14b is completely closed in itself. Rather, radial inner areas of the individual movement spaces 14b are connected with one another. Accordingly, the expression "movement space" refers to the space in which a respective deflection mass 18 moves when oscillating. In particular, in the embodiment form shown in FIG. 10, a space region may be defined in the area of the respective deflection path ends in which each of the deflection masses 18b associated with the two adjoining deflection paths 16b may enter when positioned in the respective ends of path of the adjoining deflection paths 16. However, since the deflection masses 18b move in phase, i.e., always move in the same circumferential movement direction, the state in which two masses are positioned at directly adjoining path ends cannot occur during operation. Accordingly, no disturbance results between the two adjoining deflection paths 16.

Figure 14:
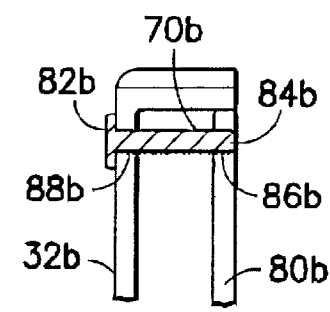
FIG. 14 is a longitudinal sectional view showing a connection between a path element and a cover plate according to an embodiment of the present invention.
Figure 15:
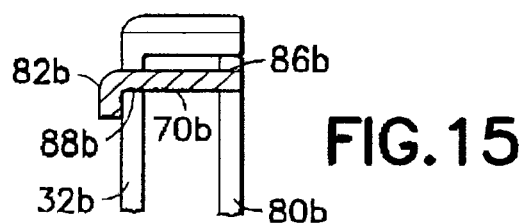
FIG. 15 is a longitudinal sectional view showing an alternative connection between a path element and a cover plate according to the present invention.

To further stabilize the arrangement shown herein, the path elements 70b are preferably fixedly connected with the cover plate 32b. As is shown in FIG. 14, a fixed connection may be effected by pressing flat the free ends of the engagement projections 82b that penetrate through the cover plate 32b. The fixed connection may also be effected by rolling the free end of these engagement portions 82b (see FIG. 15).

The embodiment of FIGS. 10–15 may also include guide paths 48b arranged in the cover plate 32b and/or in the inner plate 80b for receiving guide pins projecting from the deflection masses 18b.

Figure 10:
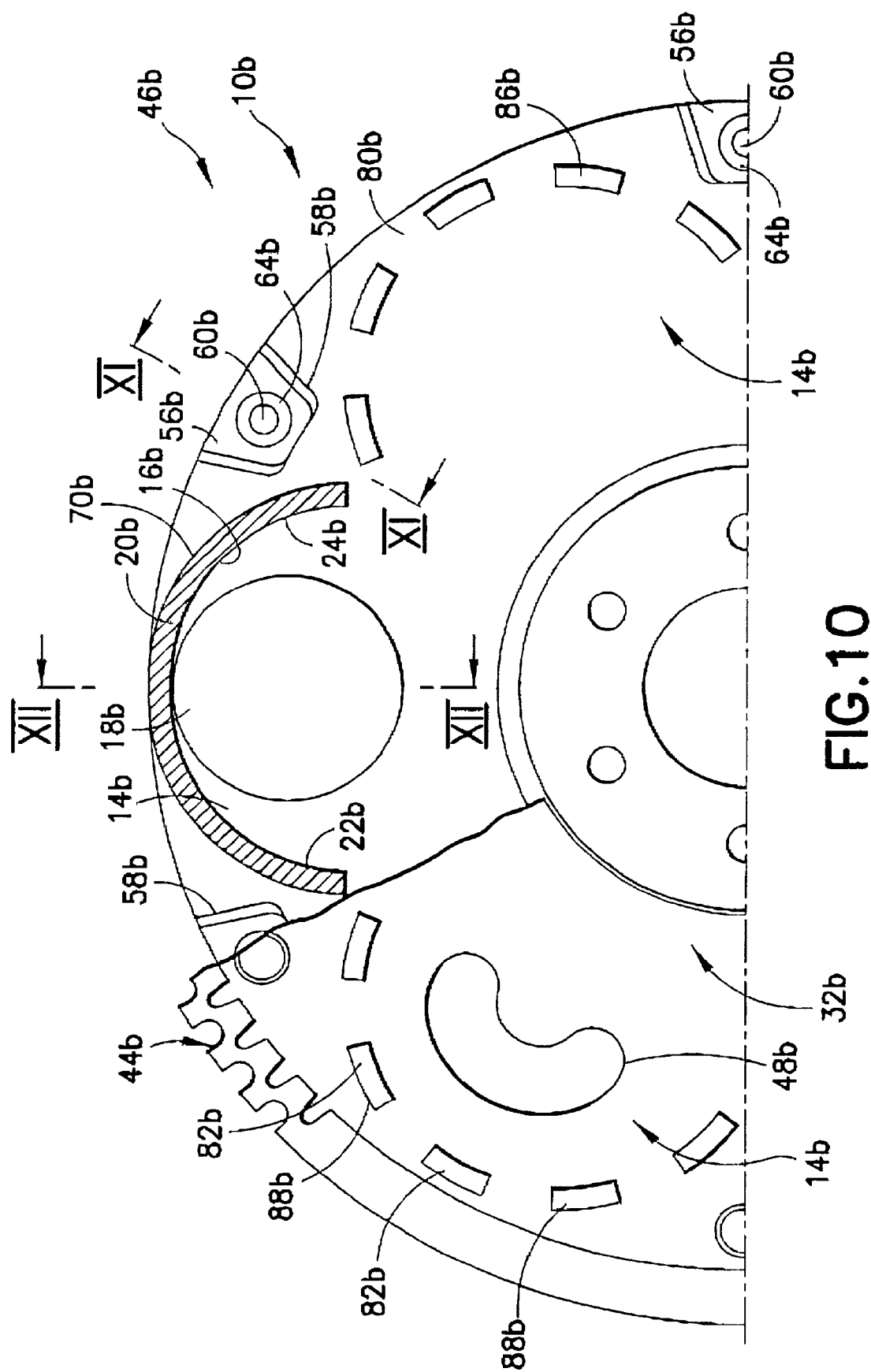
FIG. 10 is a partial axial view of another embodiment of a vibration damper according to the present invention.
Figure 11:
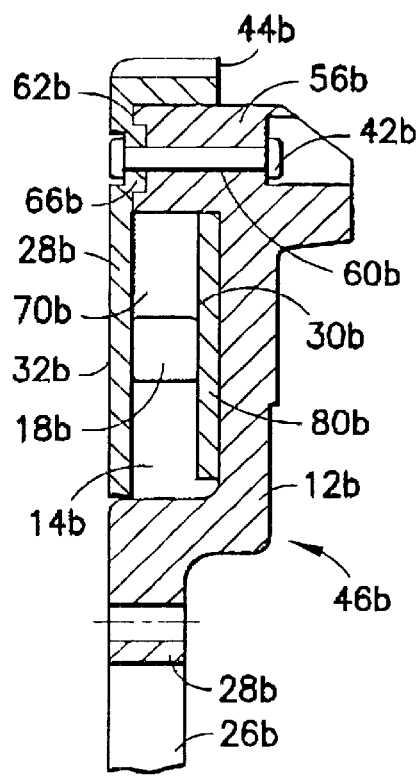
FIG. 11 is a sectional view of the vibration damping device along a line XI—XI in FIG. 10.
Figure 12:
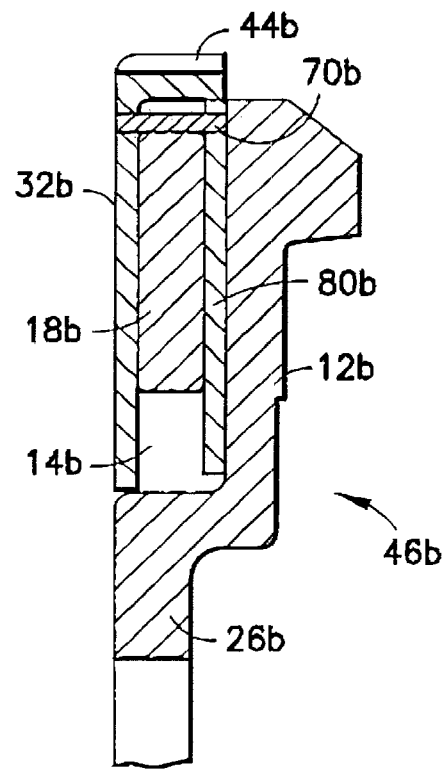
FIG. 12 is a sectional view of the vibration damping device along a line XII—XII in FIG. 10.

FIGS. 10 and 11 particularly show that the radial outer end of the cover plate 32b is bent axially in a cup configuration to form the starter ring gear 44b as an integral part thereof. FIG. 10 further shows that the vertex areas 20b of the individual path elements 70b may then be supported at a radial inner side of the starter ring gear 44b.

Figure 17:
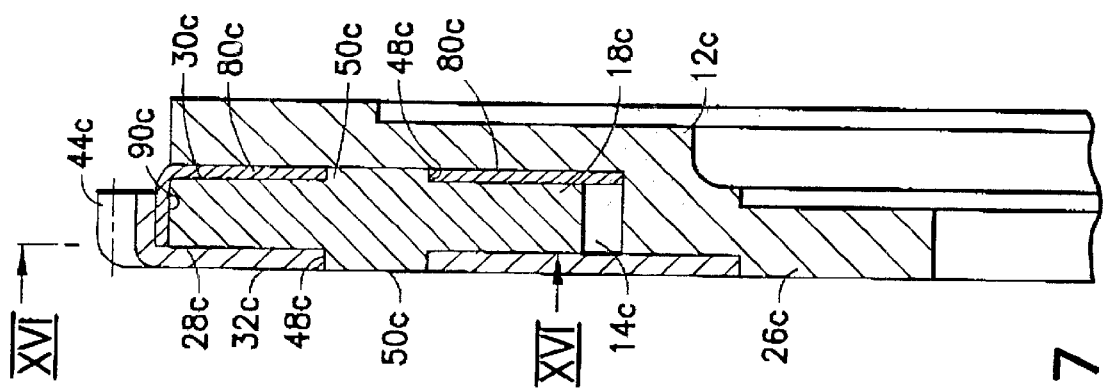
FIG. 17 is a longitudinal sectional view of the vibration damping device along a line XVII—XVII in FIG. 16.
Figure 16:
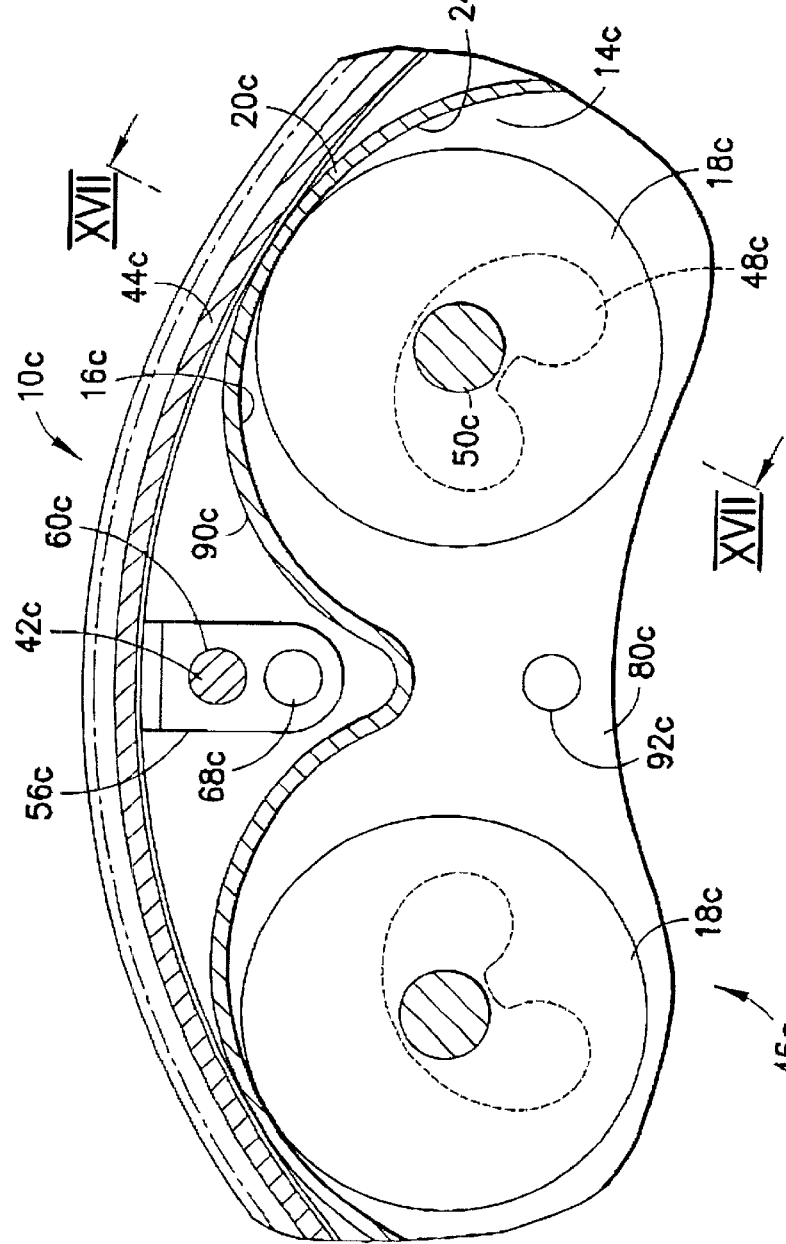
FIG. 16 is an axial view of a further embodiment of a vibration damping device according to the present invention in section along a line XVI—XVI in FIG. 17.

Another alternative embodiment form of a vibration damping device 10c according to the invention is shown in FIGS. 16 and 17. Components which corresponding to the component described above with respect to construction and function are designated by the same reference numbers with a suffix "c".

In the embodiment form according to FIGS. 16 and 17, an inner plate 80c insertable in a carrier part 12c has an integral axially bent area 90c which forms a wall defining the radial outer side of respective movement spaces 14c and simultaneously forms deflection paths 16c for deflection masses 18c arranged in the movement spaces 14c.

The radial inner side of the inner plate 80c is centered on a hub portion 26c of the carrier part 12c. A cover plate 32c arranged on the carrier part 12c is also centered by the hub portion 26c. The radial outer side of the cover plate 32c has the portion which is bent in an axial direction opposing the axial direction of bent area 90c of the inner plate 80c. The axially bent portion of the cover plate 32c forms a starter ring gear 44c as an integral part thereof. The axially bent area 90c of the inner plate 80c has vertex areas 20c at radially outer portions of each movement space 14c. These vertex areas 20c of the axially bent areas 90c which comprise the deflection paths 16c may be supported toward the radial outside at the ring gear 44c at the axially bent area of the cover plate 32c.

Further, a plurality of positioning projections 56c are provided at the carrier part 12c. As was described above, the positioning projections 56c have through-openings 60e for receiving the connection rivets 42c and may optionally have a cam receptacle 68c for receiving positioning cams which are formed at the cover plate 32c, e.g., by shaping.

To achieve a defined relative positioning of the inner plate 80c and the cover plate 32c, at least one additional positioning projection associated with the inner plate 80c may be provided at the carrier part 12c which engages in a corresponding positioning opening 92c in the inner plate 80c. Accordingly, the carrier part 12c provides a predetermined relative rotational positioning between the inner plate 80c and the cover plate 32c. This relative positioning is especially significant when guide paths 48c for receiving guide projections 50c formed at the deflection masses 18c are formed in both the inner plate 80c and the cover plate 32c.

The bent area 90c which forms the deflection paths 16c for the deflection masses 18c may be formed, for example, by a deep drawing process in this embodiment. Furthermore, a toothing may also be formed with the bent area 90c in the same way as the starter ring gear 44c. The toothing on the bent are 90c meshes with a corresponding toothing at the outer circumferential surface of the deflection masses 18c to compel a rotating or rolling movement of the deflection masses 18c when the deflection masses 18c move along the deflection paths 16c.

The movement spaces 14c of the individual deflection masses 18c communicate with one another in the embodiment of FIGS. 16 and 17, i.e., there is not a complete closure between adjacent movement spaces 14c. Rather, a closure is provided by the cover plate 32c and the inner plate 80c only at the two axial sides of the movement space 14c and a limiting or closing at the radial outer area is effected by the axially bent portion 90c of the inner plate 80c.

Figure 19:
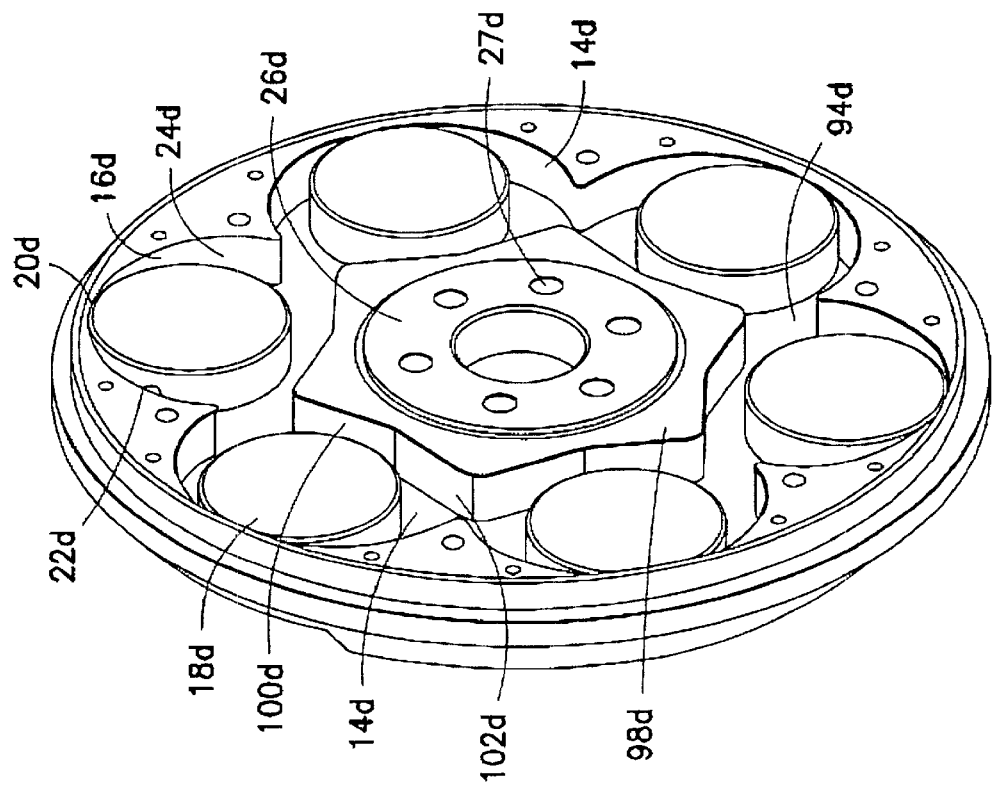
FIG. 19 shows a perspective view of the vibration damping device shown in FIG. 18 with the cover plate removed.
Figure 18:
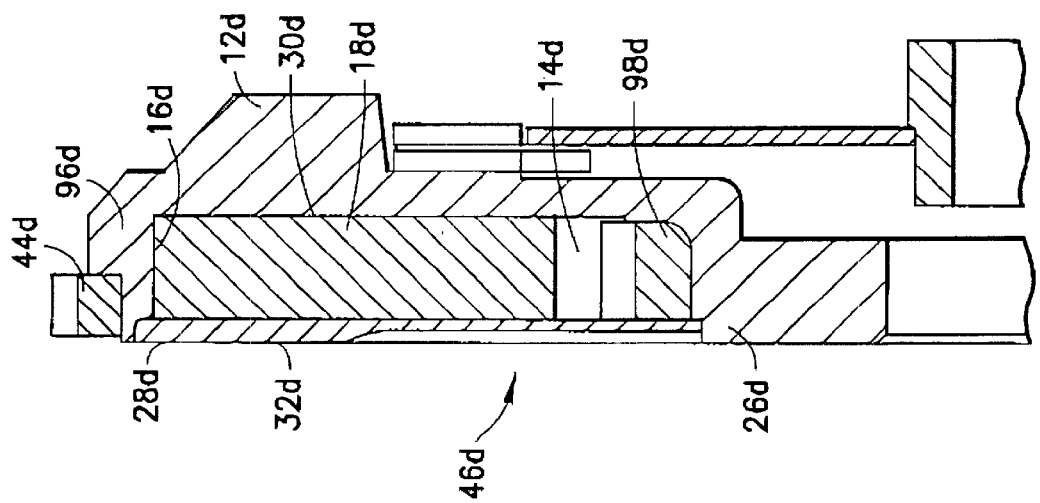
FIG. 18 is another partial longitudinal sectional view of an alternative embodiment form of the vibration damping device according to the invention.

A further embodiment form of a vibration damping device according to the invention is shown in FIGS. 18 and 19. Components corresponding to the components described above with respect to construction or function are designated by the same reference numbers with of a suffix "d".

In this embodiment, a recess space 94d is produced in a carrier part 12d which defines individual movement spaces 14d for deflection masses 18d. A radial outer wall area 96d integral with the carrier part 12d comprises a path element which forms the individual deflection paths 16d of the movement spaces 14d. A cover plate 32d is fixedly connected with the carrier part 12d by rivet bolts or the like, not shown, for closing the open axial side of the movement spaces 14d. A separately constructed starter ring gear 44d may be arranged on a radial outer side of the carrier part 12d by pressing on or shrinking on. The carrier part 12d may comprise a cast part, for example, in which the recess space 94d is formed. However, it is also possible to work the recess space 94d out of a solid carrier part 12d by a machining or cutting process.

Furthermore, the carrier part 12d has a hub portion 26d with a separate stop elements 98d arranged between each pair of circumferentially adjacent movement spaces 14d. Each separate stop element 98d comprises stop surfaces 100d, 102d for each deflection mass 18d for preventing continued movement of each respective deflection mass 18d when the end of the deflection path 16c is reached. Accordingly, the carrier part 12d forms a closure of the respective movement spaces 14d at one axial side and toward the radial outer side and a coverplate 32d forms a closure at the other axial side of the movement spaces.

It is noted that guide paths for guide pins may be provided at the deflection masses 18d and separate path elements may be introduced in the respective movement spaces 14d (see path elements 70a in FIG. 6) to provide special construction configurations. For example, a toothing or a centering may be arranged in the area of the deflection paths 16d in a simple manner by an appropriate path profile. Further, these separate path elements can be hardened in an independent work process as described above.

Further, it is noted that the term "closing" within the meaning of the present invention does not necessarily mean a complete or tight closing of a respective movement space. Rather, the closing need only be carried out to the extent that a deflection mass is securely held by the closing component in the movement space assigned to it. Therefore, a respective movement space may, for example, be partly open in the axial direction.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A vibration damping device for a motor vehicle drive system, comprising:

a base body rotatable about an axis of rotation; and a deflection mass arrangement arranged in the base body and comprising at least one deflection mass and a deflection path associated with each of said at least one deflection mass, said at least one deflection mass being movable along said deflection path during rotation of the base body about said axis of rotation, and said deflection path defining a radial outer area of a movement space in said base body in which said at least one deflection mass is movable, wherein said base body comprises a carrier element, a path arrangement comprising said deflection path for said at least one deflection mass, and a first closure element arranged on a first axial side of the path arrangement for closing the movement space for said at least one deflection mass in a first axial direction, wherein said carrier element is fixed with respect to rotation relative to said first closure element and said deflection path, and wherein said path arrangement comprises at least one path element including a separate path element for each of said at least one deflection mass, each of said at least one path element connected to and held by both said carrier element and said first closure element.

2. The vibration damping device of claim 1, further comprising a second closure element arranged at the carrier element for closing a second axial side of said movement space for said at least one deflection mass, wherein said at least one path element for said at least one deflection mass is held between said first and second closure elements.

3. The vibration damping device of claim 1, wherein said at least one path element comprises an engagement formation for engagement with said first closure element and said carrier element.

4. The vibration damping device of claim 3, wherein said engagement formation comprises a plurality of projection.

5. The vibration damping device of claim 1, further comprising a positioning arrangement operatively arranged for positioning said first closure element at a predetermined position relative to said carrier element.

6. The vibration damping device of claim 2, wherein said deflection path of said deflection mass arrangement is arranged in a radial outer area of said second closure element.

7. The vibration damping device of claim 6, wherein one of said first and second closure elements comprises a formed sheet metal element.

8. The vibration damping device of claim 6, wherein a radial outer side of said second closure element comprises an axial bent area having a free end, said axial bent area forming said deflection path, wherein said free end of said axial bent area is supportable at said first closure element.

* * * * *